(12) United States Patent
Lee

(10) Patent No.: US 11,461,177 B2
(45) Date of Patent: Oct. 4, 2022

(54) DATA STORAGE DEVICE AND METHOD OF OPERATING THE SAME

(71) Applicant: SK hynix Inc., Gyeonggi-do (KR)

(72) Inventor: Hyoung Lee Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 103 days.

(21) Appl. No.: 17/004,230

(22) Filed: Aug. 27, 2020

(65) Prior Publication Data

US 2021/0279138 A1 Sep. 9, 2021

(30) Foreign Application Priority Data

Mar. 6, 2020 (KR) .................. 10-2020-0028455

(51) Int. Cl.
| | | |
|---|---|---|
| G06F 11/14 | (2006.01) | |
| G06F 11/07 | (2006.01) | |
| G06F 11/30 | (2006.01) | |
| G06F 12/02 | (2006.01) | |
| G06F 13/16 | (2006.01) | |
| G06F 11/34 | (2006.01) | |

(52) U.S. Cl.
CPC ........ *G06F 11/141* (2013.01); *G06F 11/0772* (2013.01); *G06F 11/3037* (2013.01); *G06F 11/3433* (2013.01); *G06F 12/0238* (2013.01); *G06F 13/1668* (2013.01); *G06F 2212/1021* (2013.01)

(58) Field of Classification Search
CPC .............. G06F 11/141; G06F 11/0772; G06F 11/3037; G06F 11/3433; G06F 12/0238; G06F 13/1668; G06F 2212/1021; G06F 11/1048; G06F 2201/88; G06F 2212/7206; G06F 12/0246; G06F 2212/1024; G06F 2212/1032; G06F 2212/7203; G06F 2212/7205; G06F 2212/7208; G06F 3/0614; G06F 3/0679; G11C 16/14; G11C 16/26
USPC ........................................................ 714/763
See application file for complete search history.

(56) References Cited

U.S. PATENT DOCUMENTS

2020/0133767 A1 * 4/2020 Yang .................. H03M 13/1111

FOREIGN PATENT DOCUMENTS

| KR | 10-2017-0085286 | 7/2017 |
|---|---|---|
| KR | 10-1826140 | 3/2018 |
| KR | 10-2018-0110412 | 10/2018 |

* cited by examiner

*Primary Examiner* — James C Kerveros
(74) *Attorney, Agent, or Firm* — IP & T Group LLP

(57) ABSTRACT

A data storage device may include a storage and a controller. The storage configured to store data. The controller configured to perform a normal read operation based on a default read voltage in accordance with a read request of a host device and to perform a read retry operation using at least one retry read voltage when the normal read operation fails. The controller may comprises a hit ratio table configured to store read success records as hit ratios of retry read voltages in association with workloads, each workload being associated with a set of retry read voltages, and a read voltage determiner configured to determine the workload when the normal read operation fails and to select the set of retry read voltages associated with the determined workload, the retry read voltages in the selected set being ordered from a highest hit ratio to a lowest hit ratio.

9 Claims, 7 Drawing Sheets

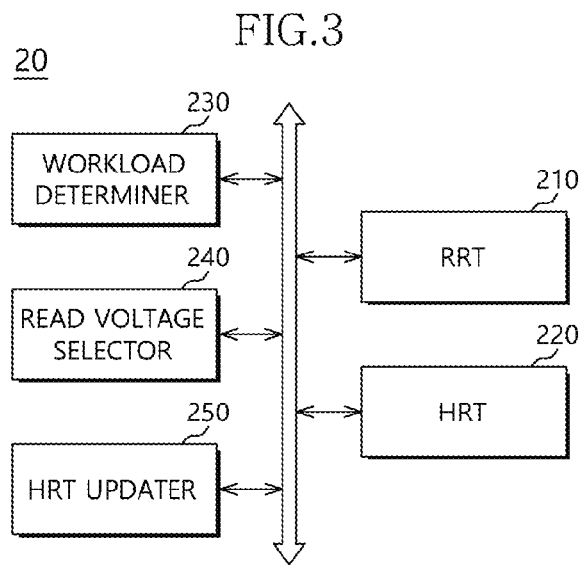

| WORKLOAD | HIT RATIO | |
|---|---|---|
| SEQ | ID1 | HR11 |
| | ID2 | HR12 |
| | ⋮ | ⋮ |
| | IDk | HR1k |
| RND | ID1 | HR21 |
| | ID2 | HR22 |
| | ⋮ | ⋮ |
| | IDk | HR2k |
| SML | ID1 | HR31 |
| | ID2 | HR32 |
| | ⋮ | ⋮ |
| | IDk | HR3k |
| ⋮ | ⋮ | |

DATA STORAGE DEVICE AND METHOD OF OPERATING THE SAME

CROSS-REFERENCE TO RELATED APPLICATION

The present application claims priority under 35 U.S.C. § 119(a) to Korean application number 10-2020-0028455, filed on Mar. 6, 2020, in the Korean Intellectual Property Office, which is incorporated herein by reference in its entirety.

BACKGROUND

1. Technical Field

Various embodiments generally relate to a semiconductor integrated device, more particularly, a data storage device and a method of operating the data storage device.

2. Related Art

A data storage device may be connected with a host device to perform data input/output operations in accordance with requests of the host device.

The data storage device may perform a read operation in accordance with a request of the host device. The data storage device may detect and correct an error in read data. The data storage device may provide the host device the error corrected read data.

Accuracy of read operation of a flash memory device may be closely related to reliability or quality of service of the flash memory device. Thus, it may be required to ensure reliability of the memory device and to reduce read latency of the memory device.

SUMMARY

In embodiments of the present disclosure, a data storage device may include a storage and a controller. The storage configured to store data. The controller configured to perform a normal read operation based on a default read voltage in accordance with a read request of a host device and to perform a read retry operation using at least one retry read voltage when the normal read operation fails. The controller may comprises a hit ratio table configured to store read success records as hit ratios of retry read voltages in association with workloads, each workload being associated with a set of retry read voltages; and a read voltage determiner configured to determine the workload when the normal read operation fails and to select the set of retry read voltages associated with the determined workload, the retry read voltages in the selected set being ordered from a highest hit ratio to a lowest hit ratio.

In various embodiments of the present disclosure, a data storage device may include a storage and a controller. The storage configured to store data. The controller configured to control the storage. The controller may comprises a read retry table configured to store a plurality of retry read voltages; a hit ratio table configured to store read success records as hit ratios of the retry read voltages in association with workloads; and a read voltage determiner configured to determine the workload when a normal read operation using a default read voltage fails and to select read voltages based on the hit ratios of the retry read voltages associated with the determined workload.

In various embodiments of the present disclosure, according to a method of operating a data storage device, the data storage device may include a storage configured to store data and a controller configured to control the storage. The controller may include a hit ratio table configured to a hit ratio table configured to store read success records as hit ratios of retry read voltages in association with workloads, each workload being associated with a set of retry read voltages. The controller may perform a normal read operation based on a default read voltage in accordance with a read request of a host device; and performing, by the controller, a read retry operation using at least one retry read voltage when the normal read operation fails, wherein the performing of the read retry operation comprises: determining, by the controller, a workload when the normal read operation fails; selecting, by the controller, the set of retry read voltages associated with the determined workload, the retry read voltages in the selected set being ordered from a highest hit ratio to a lowest hit ratio; and providing, by the controller, to the storage the selected set of retry read voltages to read data.

In various embodiments of the present disclosure, an operating method of a controller, the operating method comprising: determining a workload of a data storage device when a previous read operation fails; controlling a storage to perform a subsequent read operation with one or more read retry voltages of a selected set of read retry voltages that are associated with the determined workload, the selected set of read retry voltages being ordered according to hit ratios thereof; and updating the hit ratios when the subsequent read operation is successful, wherein the data storage device includes the controller and the storage.

BRIEF DESCRIPTION OF THE DRAWINGS

The above and another aspects, features and advantages of the subject matter of the present disclosure will be more clearly understood from the following detailed description taken in conjunction with the accompanying drawings, in which:

FIG. 3 is a diagram illustrating a read voltage determiner in accordance with an embodiment;

FIG. 4 is a diagram illustrating a read retry table in accordance with an embodiment;

FIG. 5 is a diagram illustrating a hit ratio table in accordance with an embodiment;

DETAILED DESCRIPTION

Various embodiments of the present invention are described in greater detail with reference to the accompanying drawings. The present invention, however, may be configured, arranged and/or operated differently than disclosed herein. Thus, the present invention is not limited to or by any particular embodiment. Those skilled in the art will understand that various modifications may be made within the scope of the disclosure. The present invention encompasses all such modifications that fall within the scope of the claims. Also, throughout the specification, reference to "an embodiment" or the like is not necessarily to only one embodiment, and different references to any such phrase are not necessarily to the same embodiment(s).

Figure 1:
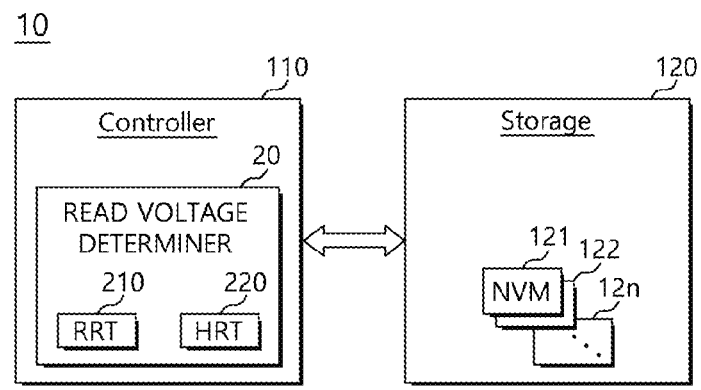
FIG. 1 is a diagram illustrating a data storage device in accordance with an embodiment.

FIG. 1 is a diagram illustrating a data storage device in accordance with an embodiment.

Referring to FIG. 1, a data storage device 10 may include a controller 110 and a storage 120.

The controller 110 may be configured to control the storage 120 in response to a request of a host device. For example, the controller 110 may program data in the storage 120 in accordance with a program (write) request of the host device. The controller 110 may provide the host device with data in the storage 120 in response to a read request of the host device. In various embodiments, the controller 110 may include a read voltage determiner 20 configured to select a read voltage based on a read retry table (RRT) 210 and a hit ratio table (HRT) 220. The selected read voltage is then provided to the storage 120.

The storage 120 may be configured to write and output the written data in accordance with control of the controller 110. The storage 120 may include a volatile memory device or a non-volatile memory device. In various embodiments, the storage 120 may include an electrically erasable and programmable ROM (EEPROM), a NAND flash memory, a NOR flash memory, a phase change RAM (PRAM), a resistive RAM (ReRAM), a ferroelectric RAM (FRAM), a spin torque transfer magnetic RAM (S-MRAM), or the like.

The storage 120 may include a plurality of non-volatile memory devices (NVM) 121~12n. Each of the non-volatile memory devices 121~12n may include a plurality of dies, a plurality of chips, a plurality of packages, and the like. Further, the storage 120 may include single-level cells (SLCs) configured to store a bit of data in one SLC, or multi-level cells (MLCs) configured to store bits of data in one MLC.

A read error may occur in the storage 120 due to changes in characteristics of a cell caused by a retention characteristic of the memory devices 121 to 12n, read disturbances, repetitive execution of the program and read operations, as well as other factors.

The controller 110 may detect and correct (ECC) the error(s) of the data read from the storage 120 in accordance with a read command. When an error check and correction (ECC) fail is generated, the controller 110 may perform a read retry operation that includes finding a read voltage at which the ECC operation passes.

In order to perform the read retry operation, the controller 110 may refer to the RRT 210. The RRT 210 may be configured to store a plurality of retry read voltages. In various embodiments, the RRT 210 may be configured to manage the retry read voltages applied to the read retry operation in accordance with an index. The controller 110 may be configured to sequentially change the retry read voltage to be used in particular read retry operation in accordance with an index sequence. When the memory cells constituting the memory devices 121~12n operate as SLCs, the retry read voltage may include a single voltage value. When the memory cells constituting the memory devices 121~12n operate as MLCs, the retry read voltage may include a set of voltage values.

The RRT 210 may be stored in the storage 120. The RRT 210 may be loaded into the controller 110 when the data storage device 10 is driven. The controller 110 may be configured to determine a retry read voltage used in operating the read retry operation based on the loaded RRT 210. For example, the determined retry read voltage may be transmitted to the storage 120 by a parameter set operation. The storage 120 may store the transmitted retry read voltage in a register. The stored retry read voltage in the register may be used at the read retry operation.

When the data read from the storage 120 is transmitted to the controller 110, the controller 110 may perform the ECC operation to correct error(s). When the error(s) is/are corrected by the ECC operation, the read operation may be determined to be normal. The error-free data may be provided from the controller 110 to the host device. In contrast, when the ECC operation fails, the controller 110 may select another retry read voltage based on the RRT 210. The controller 110 may then transmit the newly selected retry read voltage to the storage 120. The storage 120 may transmit data read using the newly selected retry read voltage to the controller 110. The controller 110 may attempt to correct any error in the received data by the ECC operation. This process may be repeated until the read operation succeeds or all retry read voltages of the RRT 210 are applied.

The HRT 220 may include retry read voltages related to a workload of the data storage device 10. The storage 20 may be fabricated with the HRT 220 having an initial (or factory set) hit ratio of read retry voltages related to respective workloads, where the initial hit ratio is experimentally determined. The HRT 220 may be updated in accordance with operations of the data storage device 10.

The read voltage determiner 20 may be configured to provide the storage 120 with a default read voltage in response to the read request of the host device to be used in a normal read operation. Hereinafter, a read operation using the default read voltage may be referred to as a normal read operation. A read operation using a retry read voltage performed after the normal read operation failed may be referred to as a read retry operation. The retry read voltage is different than the default or previously applied read voltage.

When the normal read operation or a previous read retry operation fails, the read voltage determiner 20 may determine a sequence of retry read voltages in the RRT 210 representing an order in which retry read voltages in the sequence are to be used. The read voltage determiner 20 may then provide the storage 120 with the retry read voltages in accordance with the determined sequence.

In various embodiments, the read voltage determiner 20 may determine the workload of the data storage device 10 when the read operation is performed, preferably, when the normal read operation fails. The workload may mean the type(s) or amount of a work processed by the data storage device 10 during a set time. The workload may include random or sequential access, data transmission size, a ratio between read/write operations, or a combination thereof.

The read voltage determiner 20 may select the retry read voltages related to the determined workload from the HRT 220 in the sequence or order from a high hit ratio to a low hit ratio. The read voltage determiner 20 may then provide the storage 120 with the selected retry read voltages in that sequence. The read voltage determiner 20 may calculate or a hit ratio (or revise a current hit ratio) for each of the retry read voltages that is successful and update the HRT 220 accordingly. The hit ratio of a retry read voltage may represent a success record of the read retry operation using that retry read voltage.

In various embodiments, the read voltage determiner 20 may further determine a degree of wear of the storage 120, in addition to the workload. The read voltage determiner 20 may calculate/revise hit ratios of the read voltages as read operations are performed and may be represented in the updated HRT 220. The wear degree may be determined based on numbers of program/erase operations and/or numbers of read operations on memory blocks, although alternative or additional operations may be considered.

Briefly, a normal read operation may be performed using the default read voltage in response to a read request of the host device. When the ECC fail occurs, the read retry operation may be performed. The read voltage determiner 20 may determine a current workload at the read retry operation. From the HRT 220, the read voltage determiner 20 may identify the read retry voltages related to, or associated with, the current workload. The read voltage determiner 20 may then sequentially select the retry read voltages related to the determined workload in the order from the highest hit ratio to the lowest hit ratio. The read voltage determiner 20 may then transmit the selected retry read voltages to the storage 120 in the designated order, sequentially until one of the retry read voltages results in a successful read operation. The workloads and the hit ratios of the retry read voltages managed by the HRT 220 may be updated whenever the read retry operation is performed.

The read latency of the data storage device 10 may be influenced by rapid success of the read retry operation as well as a capacity of the storage 120 and overhead of the data storage device 10 including the controller 110.

A read voltage for successfully performing the read operation may be different depending on the workload of the data storage device 10 and deterioration of memory cells in the storage. Also, the set of read voltages to be applied may be changed depending on workload and deterioration factors. When the sequence of retry read voltages to be applied are fixed, regardless of these factors, the ability to improve read latency is limited.

According to various embodiments, the sequence or order in which retry read voltages are applied may be changed based on the determined workload to reduce the number of read retry operations need to generate a successful read. Reducing the number of read retry operations that are applied may, in turn, reduce stress applied to the memory cells, thereby extending the life of the data storage device 10.

Figure 2:
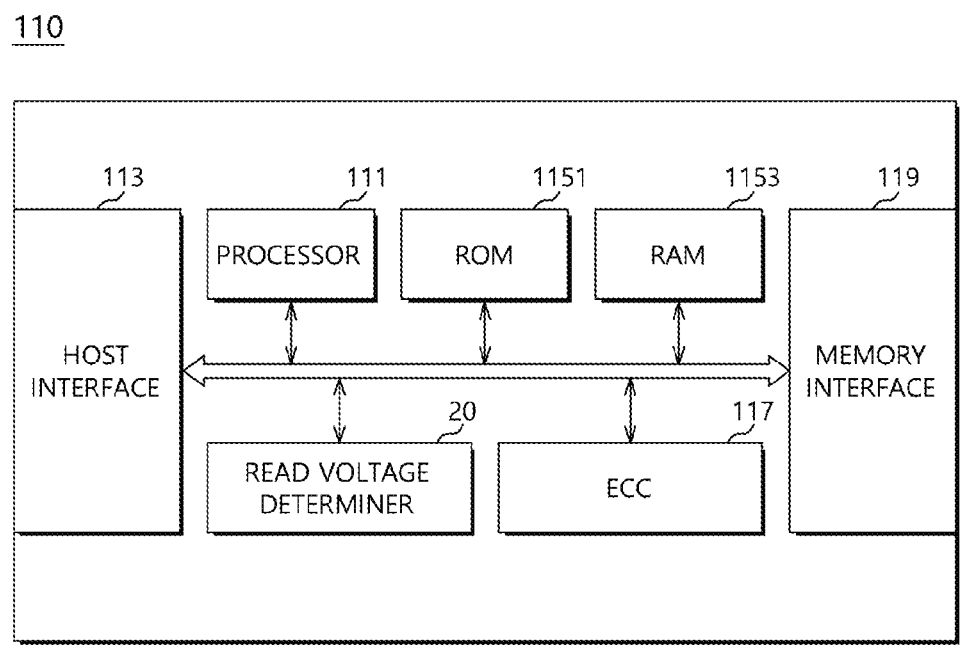
FIG. 2 is a diagram illustrating a controller in accordance with an embodiment.

FIG. 2 is a diagram illustrating a controller in accordance with an embodiment.

Referring to FIG. 2, the controller 110 may include a processor 111, a host interface 113, a ROM 1151, a RAM 1153, an ECC 117, a memory interface 119 and the read voltage determiner 20.

The processor 111 may provide the host interface 113, the RAM 1153, the ECC 117, the memory interface 119 and the read voltage determiner 20 with various control information used for reading or writing operation of data with respect to the storage 120. In various embodiments, the processor 111 may be operated in accordance with firmware provided for various operations of the data storage device 10. In various embodiments, the processor 111 may perform a garbage collection for managing the storage 120, and use a flash translation layer (FTL) for performing address mapping, wear leveling, and the like.

When a write command and a logical address are inputted into the processor 111 from the host device, the processor 111 may allot a physical address corresponding to the logical address. The processor 111 may control the write operation for writing data in a storage region of the storage 120 corresponding to the physical address.

When a read command and a logical address are inputted into the processor 111 from the host device, the processor 111 may search for a physical address corresponding to the logical address. The processor 111 may control the read operation for reading data from the storage region of the storage 120 corresponding to the physical address.

The host interface 113 may receive a command and a clock signal from the host device in accordance with the control of the processor 111. The host interface 113 may provide a communication channel for controlling input/output of data. Particularly, the host interface 113 may provide a physical connection between the host device and the data storage device 10. The host interface 113 may be interfaced with the data storage device 10 corresponding to a bus format of the host device. The bus format of the host device may include at least one of standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI Express (PCI-E), and/or a universal flash storage (UFS).

The ROM 1151 may store program codes used for operating the controller 110, for example, firmware, software, and code data used by the program codes.

The RAM 1153 may store data used for operating the controller 110 or data generated by the controller 110.

The ECC 117 may detect and correct error(s) of the data read from the storage 120.

The memory interface 119 may provide a communication channel through which signals may be transmitted between the controller 110 and the storage 120. The memory interface 119 may write data temporarily stored in a buffer memory 130 in the storage 120 in accordance with the control of the processor 111. The memory interface 119 may store the data read from the storage 120 in the buffer memory 130.

When the normal read operation performed with the default read voltage in response to the read request of the host device fails, the read voltage determiner 20 may determine the workload of the data storage device 10. The read voltage determiner 20 may provide the storage 120 with the retry read voltages related to the determined workload in the sequence from the highest hit ratio to the lowest hit ratio based on the RRT 210 and the HRT 220 to control the performance of the retry read operation. The read voltage determiner 20 may update the hit ratio of each of the retry read voltages for the determined workload after performing the read retry operation using the corresponding retry read voltage.

FIG. 3 is a diagram illustrating a read voltage determiner in accordance with an embodiment.

Referring to FIG. 3, the read voltage determiner 20 may include a workload determiner 230, a read voltage selector 240 and an HRT updater 250.

The workload determiner 230 may determine the workload of the data storage device 10 when the normal read operation fails. The workload may be determined to be a sequential read SEQ, a random read RND, or a small read SML. Alternate or additional types of workloads consistent with the teachings herein may be used as well. The sequential read SEQ workload may mean a read operation performed in response to a start logical address that immediately follows a last logical address of a previous read operation. The random read RND workload may mean a read operation performed in response to a random logical address. The small read SML workload may mean a read operation in which data of a set size or less is read, for example, a size of data no greater than a size of a page buffer of a flash memory device.

The read voltage selector 240 may select the retry read voltages based on the RRT 210 and the HRT 220 so as to perform the read retry operation when the normal read operation fails.

In various embodiments, the HRT 220 may store the hit ratios of the retry read voltages respectively in association with the workload. For a particular workload determined by the workload determiner 230, the read voltage selector 240 may sequentially select the associated retry read voltages in the order from the highest hit ratio to the lowest hit ratio from the RRT 210 based on the HRT 220 to be applied in a retry operation after the normal read operation fails.

The HRT updater 250 may update the hit ratios of the HRT 220 in accordance with results of the read retry operation.

FIG. 4 is a diagram illustrating a read retry table in accordance with an embodiment.

Referring to FIG. 4, the RRT 210 may store each of the retry read voltages RV in association with its corresponding index ID.

The read voltage determiner 20 may sequentially change the retry read voltages in accordance with the index sequence, for example, an ascending order (ID1 →ID2 →ID3 →. . . →IDk). When the storage 120 is operated in a SLC mode, the retry read voltage may have a single voltage value. In contrast, when the storage 120 is operated in an MLC mode, the retry read voltage may have a set of read voltage values.

FIG. 5 is a diagram illustrating a hit ratio table in accordance with an embodiment.

Referring to FIG. 5, the HRT 220 is configured and organized to associate groups of retry read voltages with respective workloads. In various embodiments, the HRT 220 may store the hit ratios HR11~HR1$k$, HR21~HR2$k$ and HR31~HR3$k$ of the retry read voltages in association with the workloads SEQ, RND and SML, respectively. Each hit ratio is also associated with the ID of the corresponding retry read voltage. The IDs enable cross-referencing between the RRT 210 and the HRT 220.

The HRT 220, which reflect initial hit ratios, may be stored in the storage 120. The hit ratios in the HRT 220 may be updated by the HRT updater 250 as read retry operations are performed on data in the data storage device 10.

Figure 6:
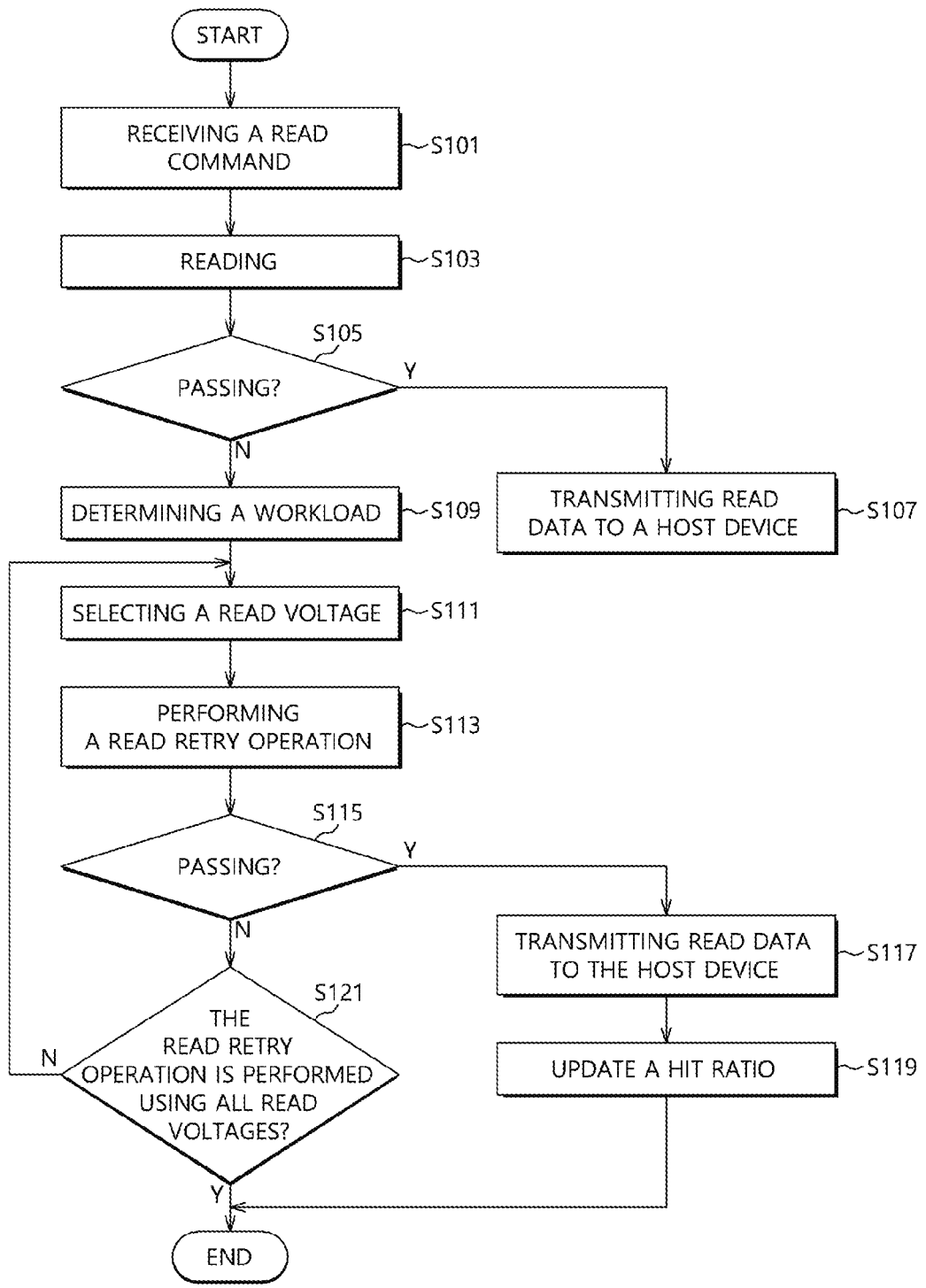
FIG. 6 is a flow chart illustrating a method of operating a data storage device in accordance with an embodiment.

FIG. 6 is a flow chart illustrating a method of operating a data storage device in accordance with example embodiments.

Referring to FIG. 6, the controller 110 may receive the read request of the host device in operation S101.

The controller 110 may provide the storage 120 with the default read voltage to control the normal read operation in operation S103.

The controller 110 may receive the data read from the storage 120. The controller 110 may perform the ECC decoding operation to determine, in operation S105, whether or not the read operation failed.

When the read operation passed (S105:Y), the controller 110 may provide the host device with the read data in operation S107.

In contrast, when the read operation failed (S105:N), the controller 110 may determine the workload of the data storage device 10 in operation S109. The controller 110 may select the retry read voltages associated with the determined workload in the HRT 220 in the sequence from the highest hit ratio to the lowest hit ratio in operation S111. The controller 110 may then transmit the selected retry read voltages to the storage 120 one-by-one in the sequence described above. The storage 120 may perform the read retry operation in operation S113. The controller 110 may receive the data read by the read retry operation to perform the ECC decoding operation, thereby determining the success of the read retry operation in operation S115.

When the read retry operation passed (S115:Y), the controller 110 may provide the host device with the read data in operation S117. The controller 110 may calculate the hit ratio the successful retry read voltage related to the determined workload to update the HRT 220 in operation S119.

In contrast, when the read retry operation failed (S115:N), the controller 110 may repeat operations S111~S115 using the next retry read voltage of the sequence S121. The loop defined by operations S111~S115 is repeated for each successive retry read voltage until one succeeds or until all retry read voltages for the determined workload are tried.

According to embodiments, providing a sequence of retry read voltages for a given workload may be determined based on the hit ratios to minimize the number of read retry operations.

Figure 7:
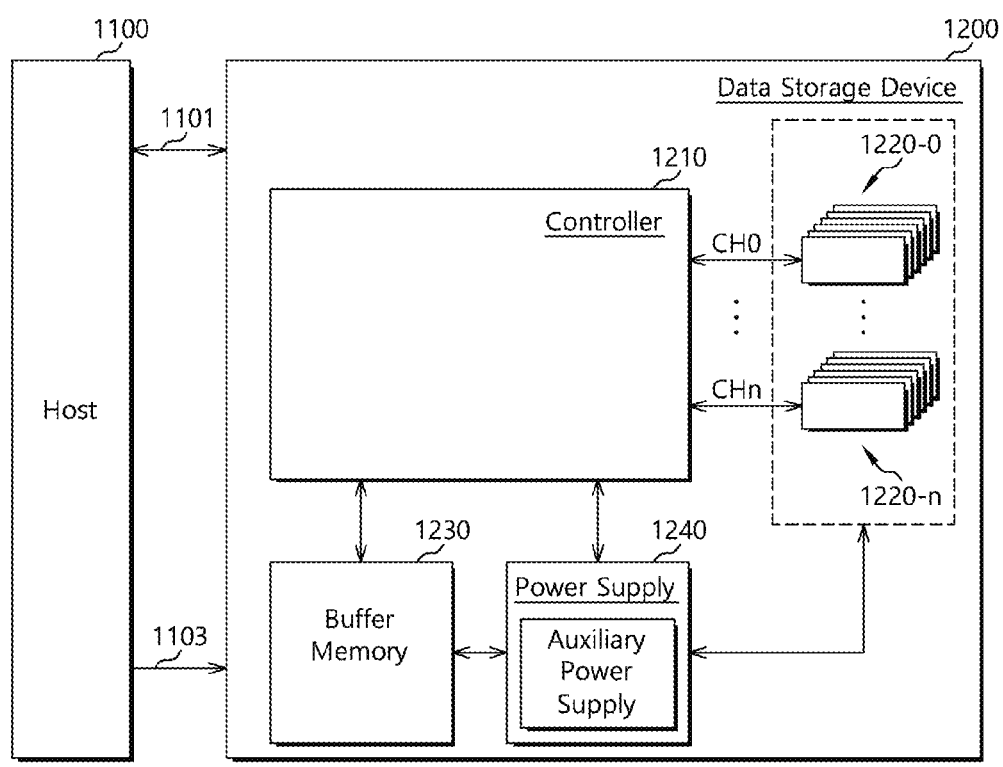
FIG. 7 is a diagram illustrating a data storage system in accordance with an embodiment.

FIG. 7 is a diagram illustrating a data storage system 1000 in accordance with an embodiment.

Referring to FIG. 7, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-$n$, a buffer memory device 1230, a power supply 1240, a signal connector 1101, and a power connector 1103.

The controller 1210 may control general operation of the data storage device 1200. The controller 1210 may include a host interface, a control component, a random access memory used as a working memory, an error correction code (ECC) component, and a memory interface. In an embodiment, the controller 1210 may configured as controller 110 shown in FIGS. 1 and 2.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-$n$. Further, the buffer memory device 1230 may temporarily store the data read from at least one of the nonvolatile memory devices 1220-0 to 1220-$n$. The data temporarily stored in the buffer memory device 1230 may be transmitted to the host device 1100 or at least one of the nonvolatile memory devices 1220-0 to 1220-$n$ according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to Chn, respectively. One or more nonvolatile memory devices may be coupled to the same channel. The nonvolatile memory devices coupled to the same channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as any of various types of connectors depending on an interface scheme between the host device 1100 and the data storage device 1200.

The power connector 1103 may be configured as any of various types of connectors depending on a power supply scheme of the host device 1100.

Figure 8:
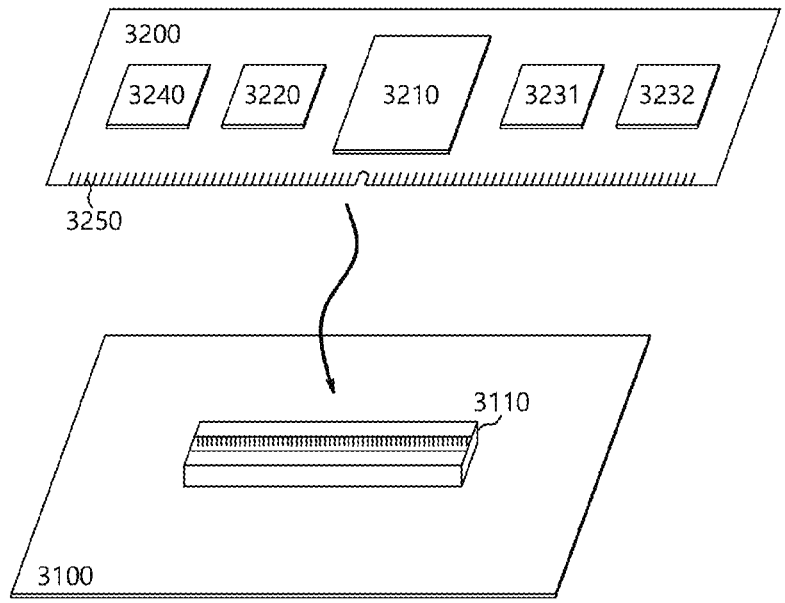
FIG. 8 and FIG. 9 are diagrams illustrating a data processing system in accordance with an embodiment.

FIG. 8 is a diagram illustrating a data processing system 3000 in accordance with an embodiment. Referring to FIG. 8, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operation of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like, and power may be transferred between the host device 3100 and the memory system 3200. The connection terminal 3250 may be configured as any of various types depending on an interface scheme between the host device 3100 and the memory system 3200. The connection terminal 3250 may be disposed on or in a side of the memory system 3200, as shown.

Figure 9:
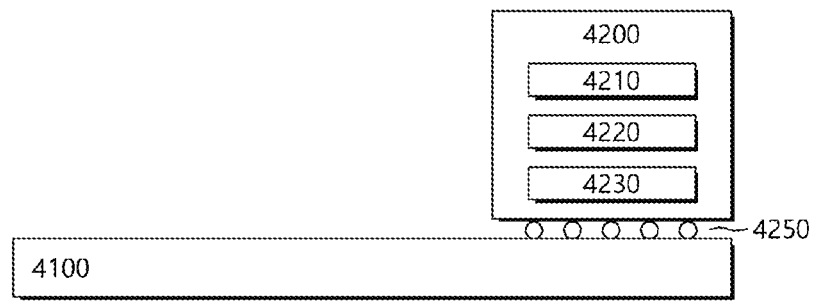

FIG. 9 is a diagram illustrating a data processing system 4000 in accordance with an embodiment. Referring to FIG. 9, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operation of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
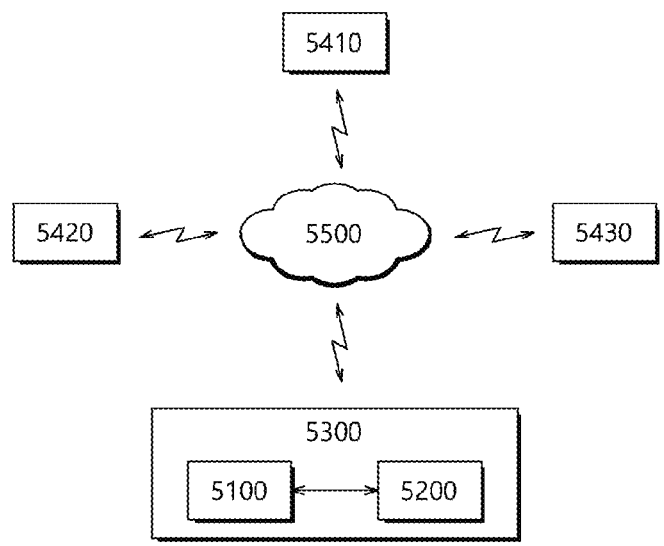
FIG. 10 is a diagram illustrating a network system including a data storage device in accordance with an embodiment.

FIG. 10 is a diagram illustrating a network system 5000 including a data storage device in accordance with an embodiment, Referring to FIG. 10, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device S100 and a memory system 5200. The memory system 5200 may be configured as the memory system 10 shown in FIG. 1, the data storage device 1200 shown in FIG. 7, the memory system 3200 shown in FIG. 8, or the memory system 4200 shown in FIG. 9.

Figure 11:
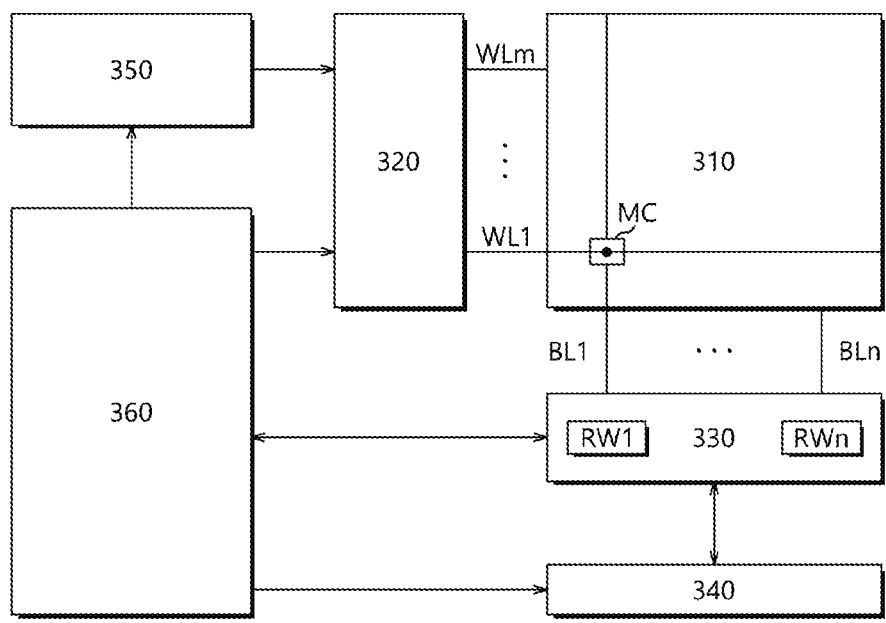
FIG. 11 is a block diagram illustrating a nonvolatile memory device included in a data storage device in accordance with an embodiment.

FIG. 11 is a block diagram illustrating a nonvolatile memory device 300 included in a data storage device, such as the data storage device 10, in accordance with an embodiment. Referring to FIG. 11, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure extending perpendicularly to the flat surface of a semiconductor substrate. Moreover, the three-dimensional memory array means a structure including NAND strings in which memory cells are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the parallel and perpendicular directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1. to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

The above described embodiments of the present invention are intended to illustrate and not to limit the present invention. Various alternatives and equivalents are possible. The invention is not limited to or by the embodiments described herein. Nor is the invention limited to any specific type of semiconductor device. The present invention encompasses any additions, subtractions, and/or modifications that fall within the scope of the appended claims.

What is claimed is:

1. A data storage device comprising:
a storage configured to store data; and
a controller configured to perform a normal read operation based on a default read voltage in accordance with a read request of a host device and to perform a read retry operation using at least one retry read voltage when the normal read operation fails,
wherein the controller comprises:
a hit ratio table configured to store read success records as hit ratios of retry read voltages in association with workloads, each workload being associated with a set of retry read voltages; and
a read voltage determiner configured to determine the workload when the normal read operation fails and to select the set of retry read voltages associated with the determined workload, the retry read voltages in the selected set being ordered from a highest hit ratio to a lowest hit ratio,
wherein the hit ratio is the number of successful retry reads for each retry read voltage with respect to a total number of successful retry reads, and
the read voltage determiner is configured to determine the workload according to at least one of an address of the storage provided with the read request of a host device or a size of data to be read according to the read request of a host.

2. The data storage device of claim 1, wherein the read voltage determiner is configured to update the hit ratio table in accordance with results of the read retry operation.

3. The data storage device of claim 1, wherein the determined workload comprises one of a sequential read operation performed in response to a start logical address immediately following a last logical address of a previous read operation, a random read operation corresponding to a read operation performed in response to a random logical address, and a small read operation of data of a size no more than a set size.

4. A data storage device comprising:
a storage configured to store data; and
a controller configured to control the storage,
wherein the controller comprises:
a read retry table configured to store a plurality of retry read voltages;
a hit ratio table configured to store read success records as hit ratios of the retry read voltages in association with workloads; and
a read voltage determiner configured to determine the workload when a normal read operation using a default read voltage fails and to select read voltages based on the hit ratios of the retry read voltages associated with the determined workload,
wherein the hit ratio is the number of successful retry reads for each retry read voltage with respect to a total number of successful retry reads, and
the read voltage determiner is configured to determine the workload according to at least one of an address of the storage provided with the read request of a host device or a size of data to be read according to the read request of a host.

5. The data storage device of claim 4, wherein the read voltage determiner is configured to update the hit ratio table in accordance with results of a read retry operation.

6. A method of operating a data storage device including a storage configured to store data and a controller configure to control the storage, the controller including a hit ratio table configured to store read success records as hit ratios of retry read voltages in association with workloads, each workload being associated with a set of retry read voltages, the method comprising:

performing, by the controller, a normal read operation based on a default read voltage in accordance with a read request of a host device; and performing, by the controller, a read retry operation using at least one retry read voltage when the normal read operation fails, wherein the performing of the read retry operation comprises:

determining, by the controller, a workload when the normal read operation fails;

selecting, by the controller, the set of retry read voltages associated with the determined workload, the retry read voltages in the selected set being ordered from a highest hit ratio to a lowest hit ratio; and providing, by the controller, to the storage the selected set of retry read voltages to read data, wherein the hit ratio is the number of successful retry reads for each retry read voltage with respect to a total number of successful retry reads, and the controller is configured to determine the workload according to at least one of an address of the storage provided with the read request of a host device or a size of data to be read according to the read request of a host.

7. The method of claim 6, further comprising updating, by the controller, the hit ratio table in accordance with results of the read retry operation.

8. The method of claim 6, wherein the determined workload comprises one of a sequential read operation performed in response to a start logical address immediately following a last logical address of a previous read operation, a random read operation corresponding to a read operation performed in response to a random logical address, and a small read operation of data of a size no more than a set size.

9. An operating method of a controller, the operating method comprising:

determining a workload of a data storage device when a previous read operation fails;

controlling a storage to perform a subsequent read operation with one or more read retry voltages of a selected set of read retry voltages that are associated with the determined workload, the selected set of read retry voltages being ordered according to hit ratios thereof; and updating the hit ratios when the subsequent read operation is successful, wherein the data storage device includes the controller and the storage, wherein the hit ratio is the number of successful retry reads for each retry read voltage with respect to a total number of successful retry reads, and the workload is determined according to at least one of an address of the storage provided with the read request of a host device or a size of data to be read according to the read request of a host.

* * * * *